United States Patent [19]

Johnson et al.

[11] 4,245,766
[45] Jan. 20, 1981

[54] FLYING STITCHER

[75] Inventors: Claris E. Johnson, Alexis; Hubert C. Crump, Galesburg, both of Ill.

[73] Assignee: Butler Manufacturing Company, Kansas City, Mo.

[21] Appl. No.: 945,551

[22] Filed: Sep. 25, 1978

[51] Int. Cl.³ .............................................. B27F 7/17
[52] U.S. Cl. .................................. 227/7; 74/58; 74/424.8 NA; 308/6 R; 227/81; 227/39
[58] Field of Search ................ 29/819, 712, 430; 227/39, 44, 143, 81, 5–7; 74/424.8 NA, 58, 89.15; 308/6 R, 6 C, 3 A

[56] References Cited

U.S. PATENT DOCUMENTS

| | | | |
|---|---|---|---|
| 1,918,587 | 7/1933 | Bryant | 74/58 |
| 1,928,134 | 9/1933 | Newhouse | 227/44 |
| 2,768,532 | 10/1956 | Russel | 74/424.8 NA |
| 3,193,164 | 7/1965 | Frasier | 227/39 |
| 3,379,393 | 4/1968 | Pilcher | 74/89.15 |
| 3,613,464 | 10/1971 | Archer | 74/89.15 |
| 3,786,979 | 1/1974 | Müller | 227/44 |
| 4,092,719 | 5/1978 | Salmon | 29/712 |

FOREIGN PATENT DOCUMENTS

| | | | |
|---|---|---|---|
| 450824 | 8/1948 | Canada | 74/424.8 NA |
| 337177 | 5/1959 | Switzerland | 227/44 |
| 225642 | 12/1968 | U.S.S.R. | 74/424.8 NA |

*Primary Examiner*—Daniel C. Crane
*Attorney, Agent, or Firm*—Shoemaker and Mattare Ltd.

[57] ABSTRACT

A flying stitcher and method of forming a panel unit wherein the panel unit is formed and stitched in a continuous process. The stitches are placed in panels by a stitching head which moves with the panel so that the panel need not be stopped/started during a stitching operation.

44 Claims, 15 Drawing Figures

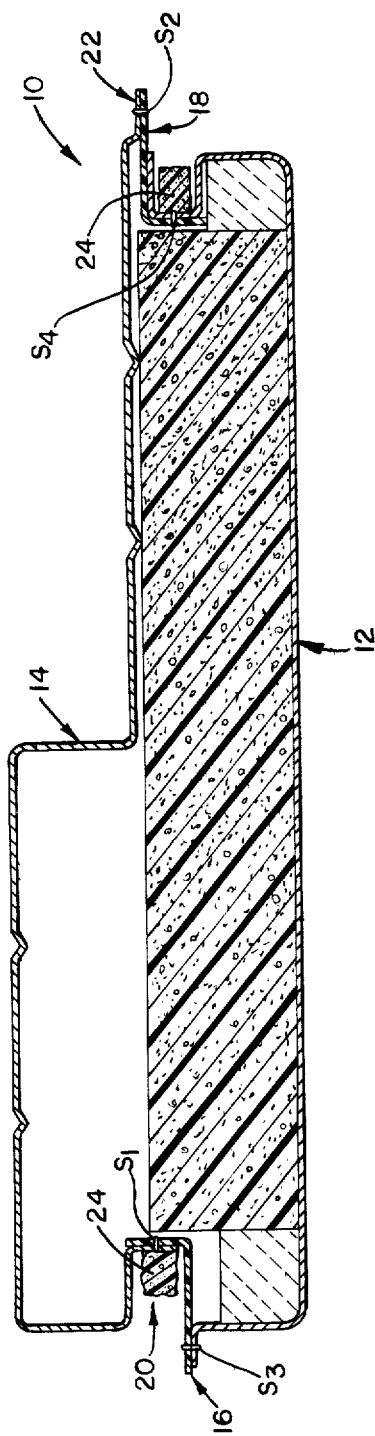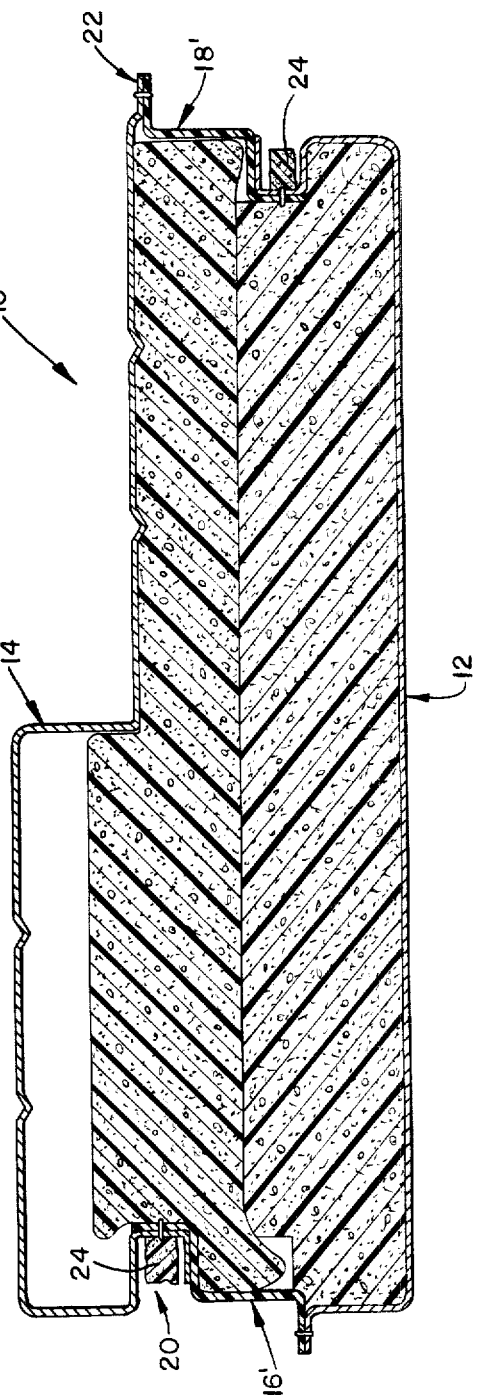

FIG. 4A.
FIG. 4B.
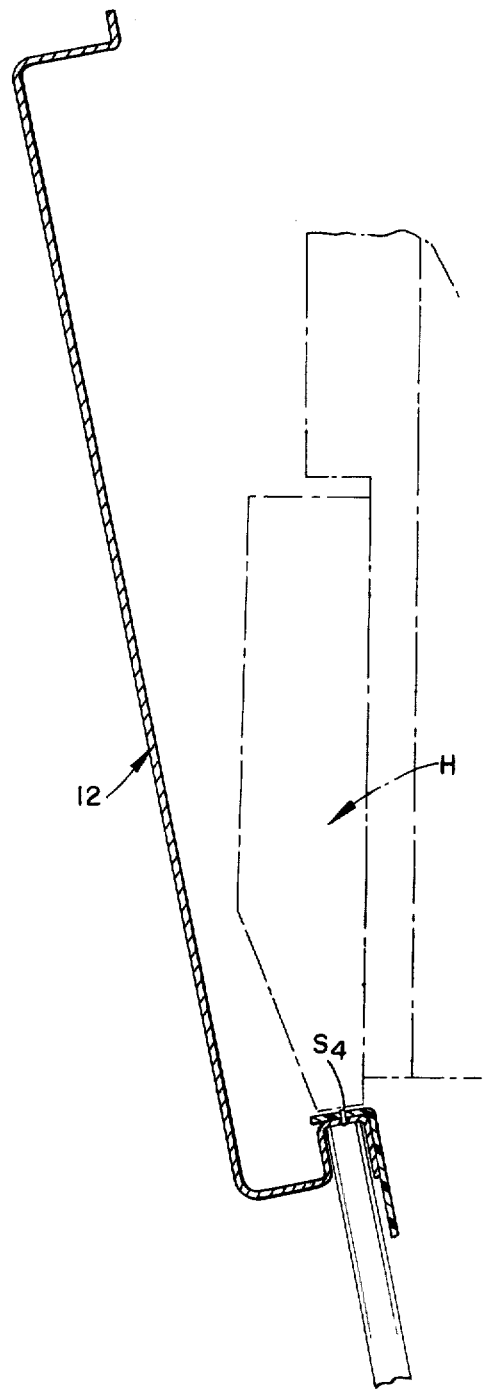
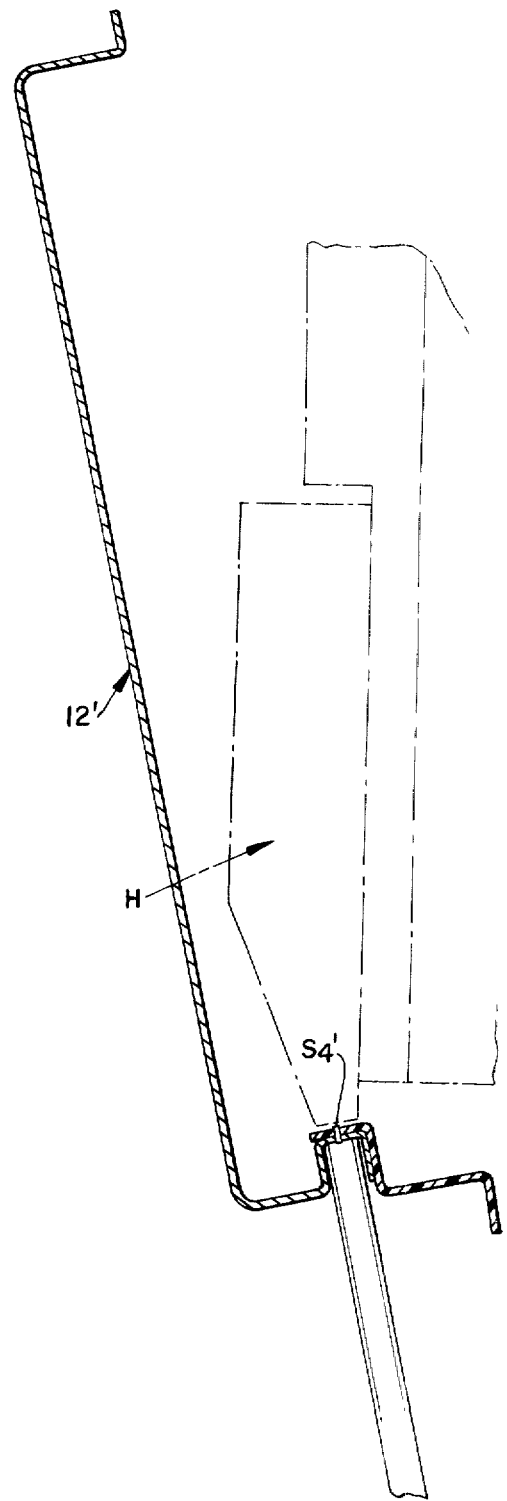

1

FLYING STITCHER

BACKGROUND OF THE INVENTION

The present invention relates in general to building panels, and, more particularly, to processes and means for forming building panels.

Many modern buildings use preformed building panels. These panels provide versatility as well as economy to the building, and thus have become in great demand in recent times. The assignee of the present invention manufactures and markets a product under the trademark MONOPANL. The product comprises two metal facings which are metal stitched together to sandwich a core of fiberglass insulation. The panel units are formed in a process wherein the elements are constantly moving. Such a "continuous flow" process is efficient and thus enhances the acceptability of these units. The end product is an insulated exterior building wall panel unit. The metal stitching is done with Interlake/Acme metal stitching units. The stitches are placed on six inch centers along both edges, and along the full length of the panel.

In the past, the units have been mounted on a stationary supporting frame and the components propelled past the stitching units. In past processes, the panel has stopped for every stitch required. The start/stop time of the panel is a severe limitation of the desired production rate, and therefore represents a drawback to the overall process of forming such panel units. Such start/stop steps severely limit production efficiency, and hence represents a major drawback to the further growth of the use of these panels. Accordingly, there is need for a means and process for stitching metal facings together to form a panel unit which does not require stopping the movement of that panel to execute the stitching step.

SUMMARY OF THE INVENTION

The means and process embodying the teachings of the present invention permits fabrication of a panel unit in a continuous flow process without requiring the inclusion in that flow process of start/stop steps to execute stitching operations.

The means and process embodying the teachings of the present disclosure are preferably used in the production of the aforementioned MONOPANL units. These units are fully described in U.S. Pat. No. 4,107,892, issued on Aug. 22, 1978 to Norman A. Bellem (hereinafter referred to as "Bellem"). The disclosure of the Bellem Patent is fully incorporated herein by reference thereto.

The MONOPANL units are, preferably, approximately a foot wide and the modular panel can be produced in lengths up to 40 feet, though it is normally applied to one or two story structures. The panel unit is composed of an exterior metal skin, fiberglas batt, and an interior metal skin, stitched together with an insulating strip with metal staples.

Main steps in the production process for these units are: (1) forming the metal to two different configurations—interior and exterior; (2) stitching an insulating strip in a single-head stitching machine to one side of the interior and exterior parts, respectively; (3) placing fiberglas batt in the interior part; (4) final stitching in a dual head stitching machine of both sides of the interior and exterior parts into the "finished" part; (5) placing an insulating strip with adhesive backing in the groove where the modular panels join.

Operations begin with coils of prepainted steel. In most cases, the outside material is embossed. The inside face is usually smooth. A range of colors can be provided. The coil goes into a roll-forming line preferably driven by Allen-Bradley Bulletin 1374 5 hp regenerative drives controlled by the programmable controller for line tracking. Hereinafter, Allen-Bradley will be abbreviated as "A-B", or simply "Bulletin". After being formed to shape, the material passes through a flying cutoff press which cuts the material to length. A photocell senses the end of the part and trips the press. The die is accelerated to match line speed by a cam and ramp accelerator. Line speeds are preferably about 40 to 50 fpm.

The material travels on three extensive belt conveyor sections, all directed by a programmable logic controller (P.L.C.). Preferably, the P.L.C. is a Bulletin 1774 P.L.C. Position of the material is sensed by proximity sensors and photocells at regular intervals. This data is fed into the controller to control location of all parts on the conveyor system at all times. A-B Bulletin 1313¾ hp drives power the conveyors, and their speed is controlled to match assembly line speeds. This system avoids jam-ups and possible part damage and keeps the operation moving smoothly.

At the end of this conveyor system, a transfer device arm pushes the part onto a side transfer conveyor which takes it to an upender. The upender lifts the part to the operator's position and puts it in the vertical plane.

At this point, the part, along with an insulating strip, is fed into subassembly stitching. Preferably, a Bulletin 1374 ¼ hp DC drive feeds the part through. A drive operates a ball screw which accelerates the stitching head to match the speed of the part traveling through. Preferably, this drive is a Bulletin 1374 ¾ hp drive. This drive also is under control of the P.L.C. programmable controller. Speed settings come from analog outputs on the controller. An encoder in the system measures the amount of panel that goes through the line so that the stitching center dimension can be controlled. This data also feeds into a special input card on the controller.

After the insulating strip has been stitched in, the metal panel traveling through the subassembly machine reaches a saw position where the strip is severed to separate the panels. It is noted that the insulating strip is continuous and the panels are of fixed length; hence, there is a need to cut the strip at this point. A photocell sights the gap between the panels. It initiates this sequence: A gauge comes out and drops into the slot between the panels. This causes the saw to travel, "wipe" through the joining strip, and return to home position. This gauge movement is governed by the controller, utilizing a time control and comparison logic. One timer and four steps of operation check the dimensions at the various points in time.

In the final stitching operation, another side transfer device pushes off the part onto a conveyor which brings it to the final stitching station. Here it is merged with the other face. The inside face has had a second operation after being stitched. Fiberglas batts are installed, either automatically or, preferably, by hand into the panel, after the joining strip has been assembled to it. These parts also are side transfered in the opposite direction, to the final stitching machine. Assembly of these parts on that conveyor system can be hand or automatic.

Both parts are fed into the final stitching machine, which has a post that emerges to match the ends. The operator hits the start button to initiate the fully automatic operating cycle.

The material comes out of the final stitching machine stapled on both sides. The stitching head oscillator moves the Interlake/Acme stitching head, tracking the panel speed, during the stitch cycle and returns the head to home position ready for the next cycle to begin.

The reciprocating motion is achieved by using a ball screw and ball nut driven by a reversible D.C. motor which is monitored by an encoder/impulse generator. The motor drives the ball screw at a rate equal to the panel speed allowing the stitching unit time to cycle. Then the D.C. motor reverses and brings the unit back to a home position.

The stitching unit is supported on three low friction, lineal ball bearing bushings and two precision shafts. This provides the stability needed to perform the stitching operation, yet allows the reciprocating motion needed to stitch material as it moves past the unit at a preset velocity. Thus, the stitcher essentially has a triangular mounting which prevents any excessive wandering of the stitch point due to freeplay. The triangular mounting provides greater stability to keep the stitching point in more precise position.

The reciprocating motion is achieved by a ball nut mounted on the stitching unit. A ball screw threaded into this unit is supported by two radial/thrust ball bearings. The screw shaft is driven by an encoded/pulse generator controlled permanent magnet D.C. motor through a gear belt drive line.

Control of the stitching unit is attained by the use of a programmable logic controller (P.L.C.) and sensing devices. Material is powered through the stitching area by another D.C. motor powering drive rolls through a gear reducer and a gear belt drive train. This drive is monitored by an encoder/impulse generator which senses the lineal inches of material run. At predetermined intervals a new stitch cycle is instigated by the P.L.C. using measurements provided by the drive encoder. When a new cycle begins, an oscillator drive motor accelerates the stitching unit. Acceleration of this unit is controlled by oscillator encoder information fed back to the P.L.C. to maintain a relative panel to stitching unit speed of zero. Next, a stitcher clutch is engaged. A stitch is driven through the material of the panel, the clutch is disengaged, and a stitcher brake is applied stopping the stitcher unit in a ready for next cycle position. Coincident with clutch disengagement, the oscillator drive motor is reversed causing the stitching unit to decelerate, stop and then return to a home position. Home position is then determined by a proximity sensor which, on the return cycle, senses the unit, decelerates its travel and stops the unit in a predetermined position. Now the unit is ready for the next cycle. Overtravel of the ball screw in either direction is limited by overtravel limit switches. Two ball screw accelerators, one for each of the dual stitching heads on the machine, are, preferably, driven by ¾ hp A-B Bulletin 1374 drives.

An insulation strip is then applied to the joint between the two faces to prevent wind from entering the panels and rattling them. This step can be automated or carried out by hand.

The finished part travels on two more conveyors (powered by ¾ hp Bulletin 1313 drives) to a cross transfer conveyor, where it is taken to a packaging station. Here, operators place end plates on the panels. The panels are then placed in packages, with a scrim of expanded plastic placed over them to prevent marring of painted surfaces in shipping.

The process and means of the present invention are simply set up and easily serviced, thereby being very easily maintained.

Elimination of the start/stop panel drive mechanism eliminates items which are difficult to fabricate and service and permits the drive equipment to run longer between service times than in the prior art which includes the start/stop panel drive mechanism. Also, service times are reduced from those prior art systems.

System operation is smooth, and production rate is steady and easy to maintain, especially as compared to prior systems. The present system is quieter than prior systems.

OBJECTS OF THE INVENTION

It is accordingly a main object of the present invention to stitch a panel while that panel is moving.

It is another object of the present invention to form a double panel unit in a continuous, non-stop fabrication process.

It is a further object of the present invention to automatically control formation of a panel in a continuous, non-stop fabrication process.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIGS. 1 and 2 show two forms of a panel unit formed according to the teachings of the present invention.

FIGS. 4A–5B show panels being stitched according to the teachings of the present invention.

DETAILED DESCRIPTION OF THE INVENTION

Figure 3:
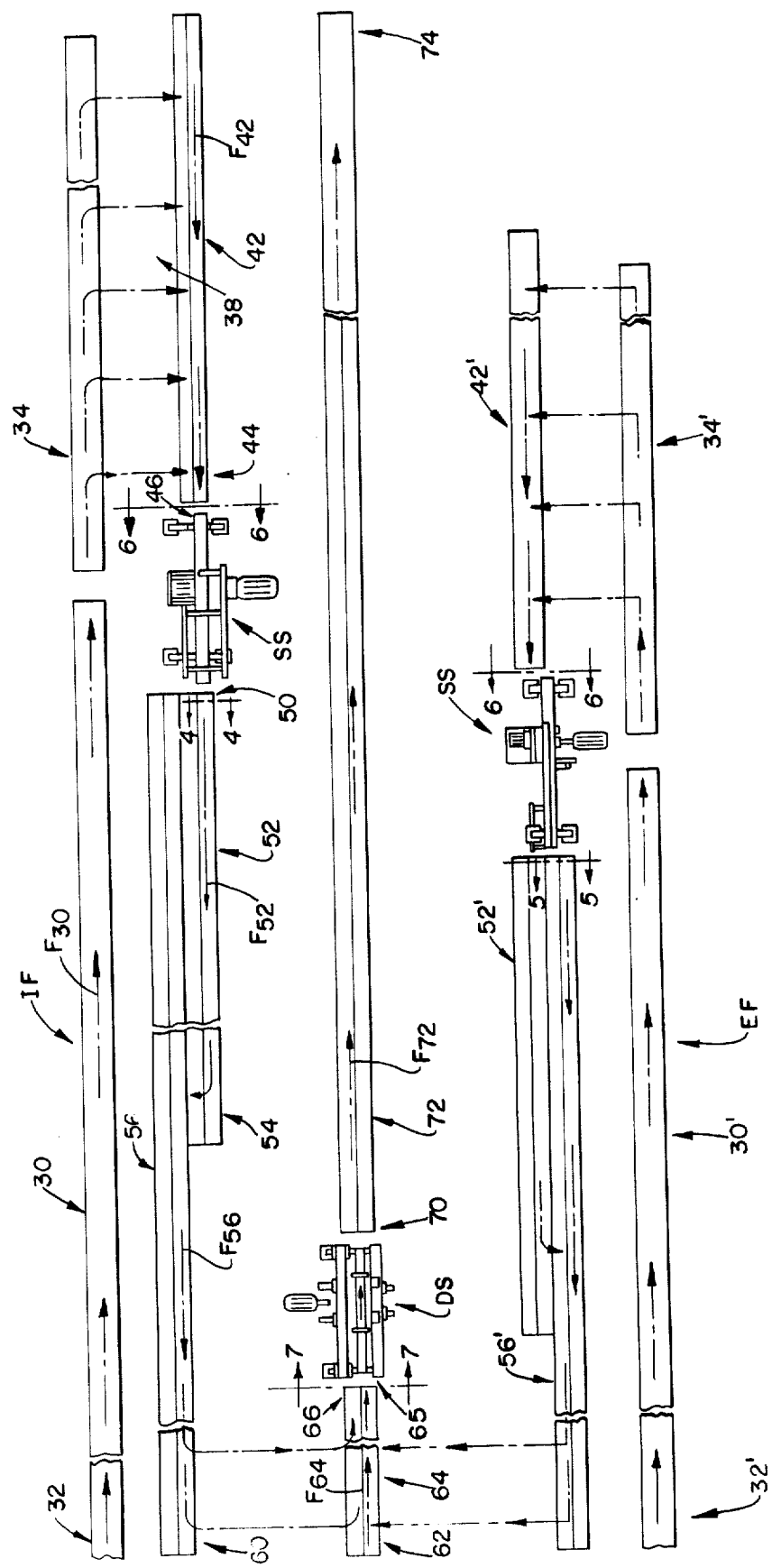
FIG. 3 is a schematic flow diagram of a fabrication process embodying the teachings of the present invention.

Shown in FIGS. 1 and 2 are two forms of a panel unit formed by the means and process embodying the teachings of the present disclosure. The panel unit is fully described in the aforementioned Bellem Patent, and a three inch unit 10 is shown in FIG. 1, while a four inch unit 10' is shown in FIG. 2. Each of the units includes a planar interior wall 12 and a stepped exterior wall 14 coupled together by coupling elements 16, 16' and 18, 18', respectively. The coupling elements on panel unit 10 are J-shaped, and the coupling elements on panel unit 10' are zig-zag shaped.

The coupling elements include a channel 20 defined on the marginal edge of one of the wall panels and a wing-defining projection 22 defined on the other of the wall panels. The channel and wing-defining members of each coupling element are offset and spaced apart. Adjacent wall panel units can be matingly joined with the wing members received in the channel members.

Strips of deformable material 24, such as impregnated flexible foam, or sealant, or the like, are positioned in the channels, and the wing members are embedded in the material upon coupling adjacent units together. The material has a very low thermal conductivity and serves as a structural tie as well as a thermal break.

The wing-strip joints enable the units to be securely held together, yet be adjustable during installation to produce a proper, though secure, installation.

The units are symetrical and therefore common accessories in flashing can be used, thereby preventing any inducement of added construction costs. Furthermore, the units are nestable for easy storage and expeditious shipping.

A production line layout is shown in FIG. 3 and includes a first system IF of linear conveyors for handling interior face forming panels and a second system EF of linear conveyors for handling exterior face forming panels. The conveyor system IF includes a first conveyor 30 which has in input end 32 located to receive a formed panel from a supply and former means (not shown) and moves that panel along a fabrication path in a direction indicated by arrow $F_{30}$ to an end section 34. Material is preferably supplied from a supply reel to a former which forms that material into a panel. Shears or other cutoff means can be used in conjunction with the supply and former, and a preferred cutoff means includes a flying shear such as disclosed in U.S. patent application Ser. No. 911,684, filed June 1, 1978. At end section 34, the panel is tipped up from a horizontal orientation into an edge upward orientation. Thus, a planar panel moves along conveyor 30 with the planer faces thereof essentially parallel to the ground, and is then tipped up to have those planer faces oriented to be non-parallel to the ground, and perhaps essentially vertical, with respect to the ground by a tiltup means, or upender means 38 (not shown in detail). The edge upright panel is then moved onto conveyor 42 and moved along the fabrication path in the direction of arrow $F_{42}$ by the conveyor 42. The conveyor 42 has an exit end 44 located adjacent input end 46 of the first stitching machine SS which is a single stitching machine and will be described in greater detail hereinafter.

The interior panel moves through the first stitching machine SS where the first end coupling elements are attached and moves onto inlet end 50 of a conveyor 52. The conveyor 52 has an exit end 54 and moves the interior panel along the fabrication path in the direction of arrow $F_{52}$. The panel then moves onto conveyor 56 which moves the panel along the fabrication path in the direction of arrow $F_{56}$ to an exit end 60 of the conveyor 56.

The interior panel is then transferred, either automatically by a side transfer device (not shown) or by hand, from the conveyor 56 exit end to inlet end 62 of conveyor 64, which then moves that panel along the fabrication path in the direction indicated by arrow $F_{64}$. The conveyor 64 has an exit end 66 located adjacent inlet end 68 of a second stitching machine DS which is a dual stitcher and will be described in greater detail hereinafter.

The dual stitching machine DS unites the inner and outer panels to form a panel unit 10 or 10' as shown in FIGS. 1 and 2 by attaching the inner panel to the outer panel via the end coupling elements. As will be discussed below, the dual stitching machine is comprised of a pair of single stitching machines and these stitching machines SS and DS form stitches $S_1$ through $S_4$ in the panel units as shown in FIGS. 1 and 2.

The panel unit exits the dual stitching machine DS onto inlet end 70 of conveyor 72 and is moved thereby along the fabrication path in the direction of arrow $F_{72}$ to the exit end 74 of the conveyor 72, and from that exit end 74 to a packing area (not shown). Batting, or other such insulation, is positioned in the panels prior to the superpositioning of the interior and exterior panels as will be evident from the above disclosure and from the disclosure of the Bellem Patent.

The formation of the exterior panel is similar to the formation of the interior panel and the production line therefore will not be further discussed. The exterior production line in FIG. 3 includes a conveyor system EF and the prime notation is used to indicate elements therein which correspond to elements in the just-described interior panel production line. The panel is supplied from a supply and former area (not shown) located adjacent the inlet end 32' of the first conveyor 30'.

Figure 5A:
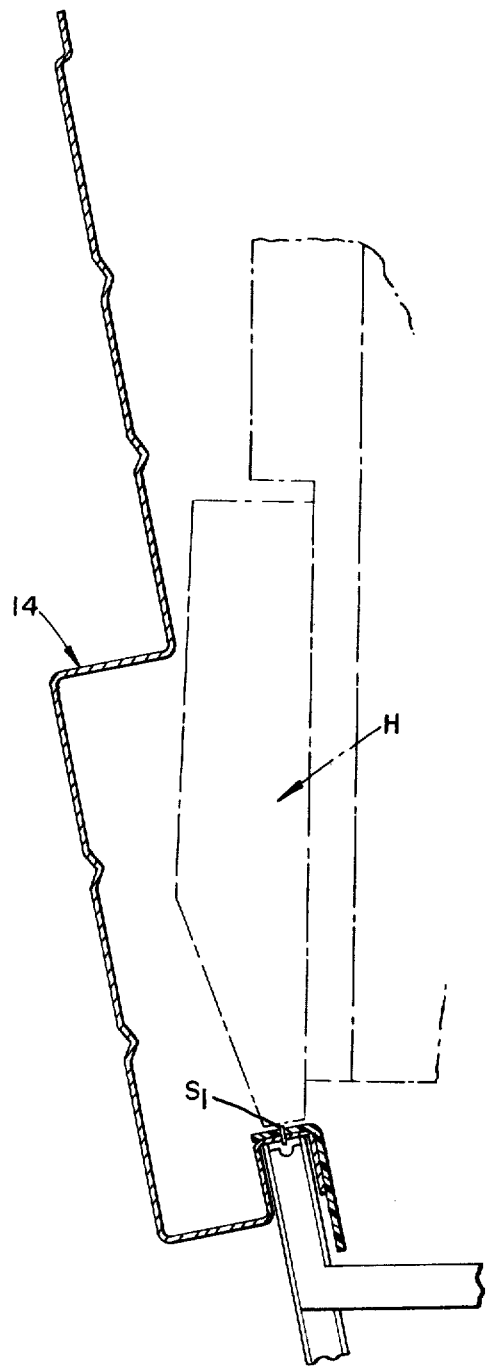
Figure 5B:
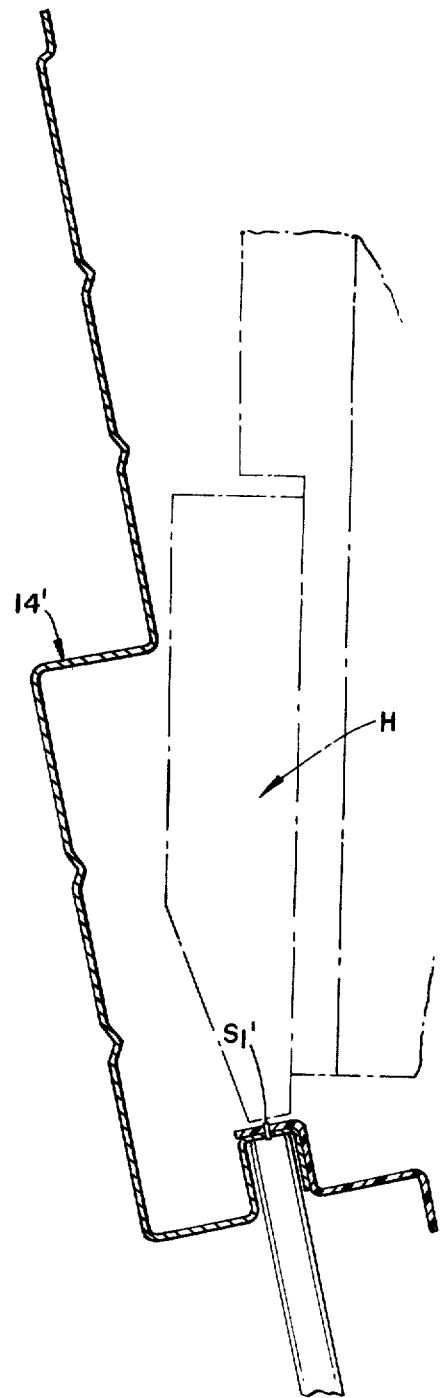

Stitches $S_1$ through $S_4$ are formed using stitching units known to those skilled in the art, and a preferred form of the stitching unit is produced by Interlake/Acme Corporation. A stitch setting step is indicated in FIGS. 4 and 5. As shown in FIGS. 4 and 4A, a three inch panel interior face 12 has stitch $S_1$ set by a stitcher head H, and a four inch panel interior face 12' has stitch $S_1'$ set by a stitcher head H' which is oriented at an angle if viewed with respect to the stitcher head H. Stitcher units for the exterior panels are indicated in FIGS. 5 and 5A for the three and four inch panels, respectively, to set stitches $S_4$ and $S_4'$ in those panels. Similar stitching heads are used in the dual stitching machine DS to set stitches $S_2$ and $S_3$ in the superposed panels to form the panel unit. As above mentioned, the stitcher units are known to those skilled in the art, and are modified according to the teachings of the present disclosure to move with the panels as those panels move along the fabrication path. Moving stitcher heads in a path and at a velocity chosen to match the path and velocity of panel movement eliminates a bottleneck which has heretofore occurred at the stitching heads because panel movement had to be stopped each time a stitch was set. Moving the stitching heads in concert with the panel produces a continuous flow of panel operations which results in increased panel unit fabrication efficiency with a concomitant increase in panel unit desirability.

Figure 6:
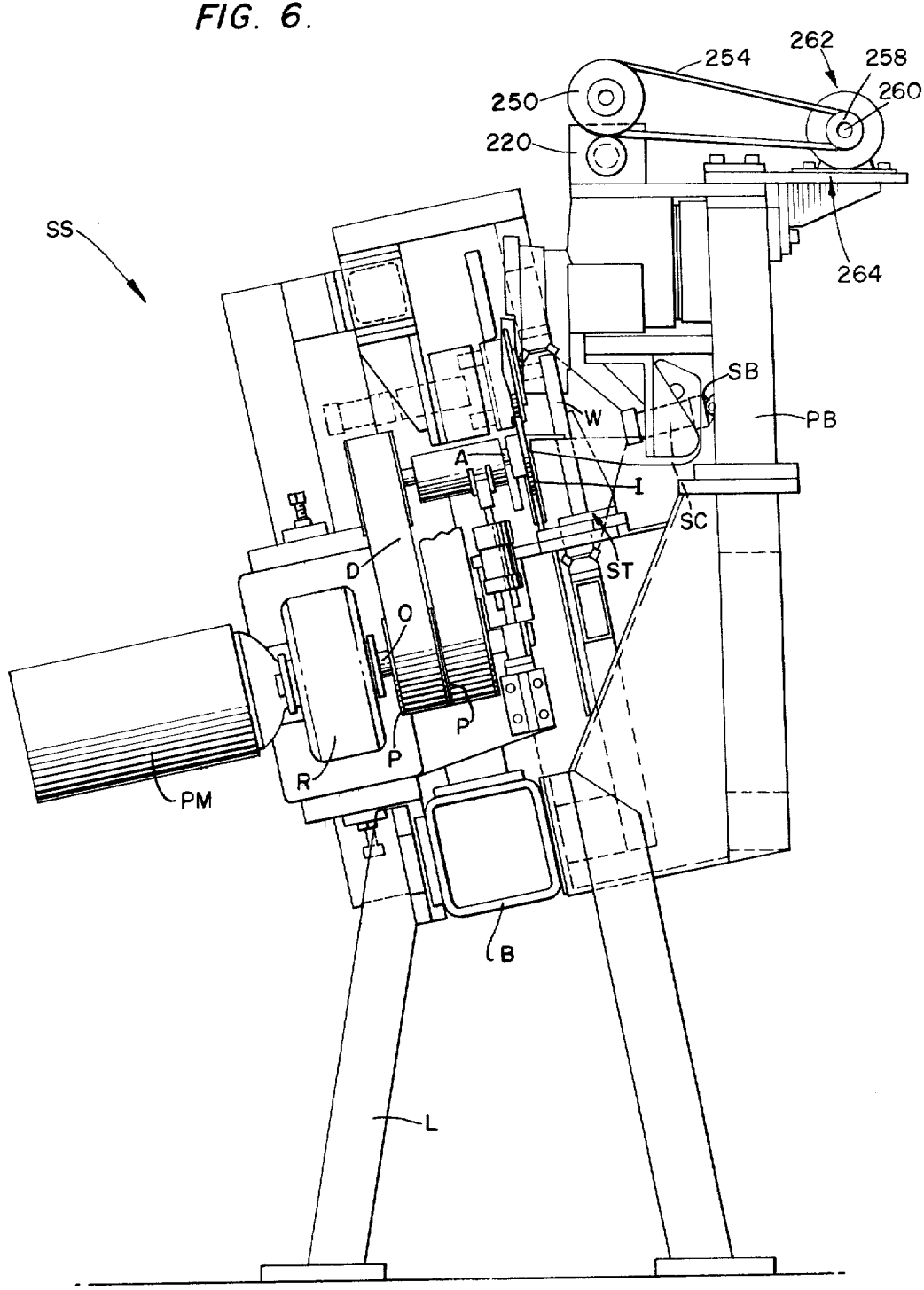
FIG. 6 is an elevation view taken along line 6—6 of FIG. 3.
Figure 7:
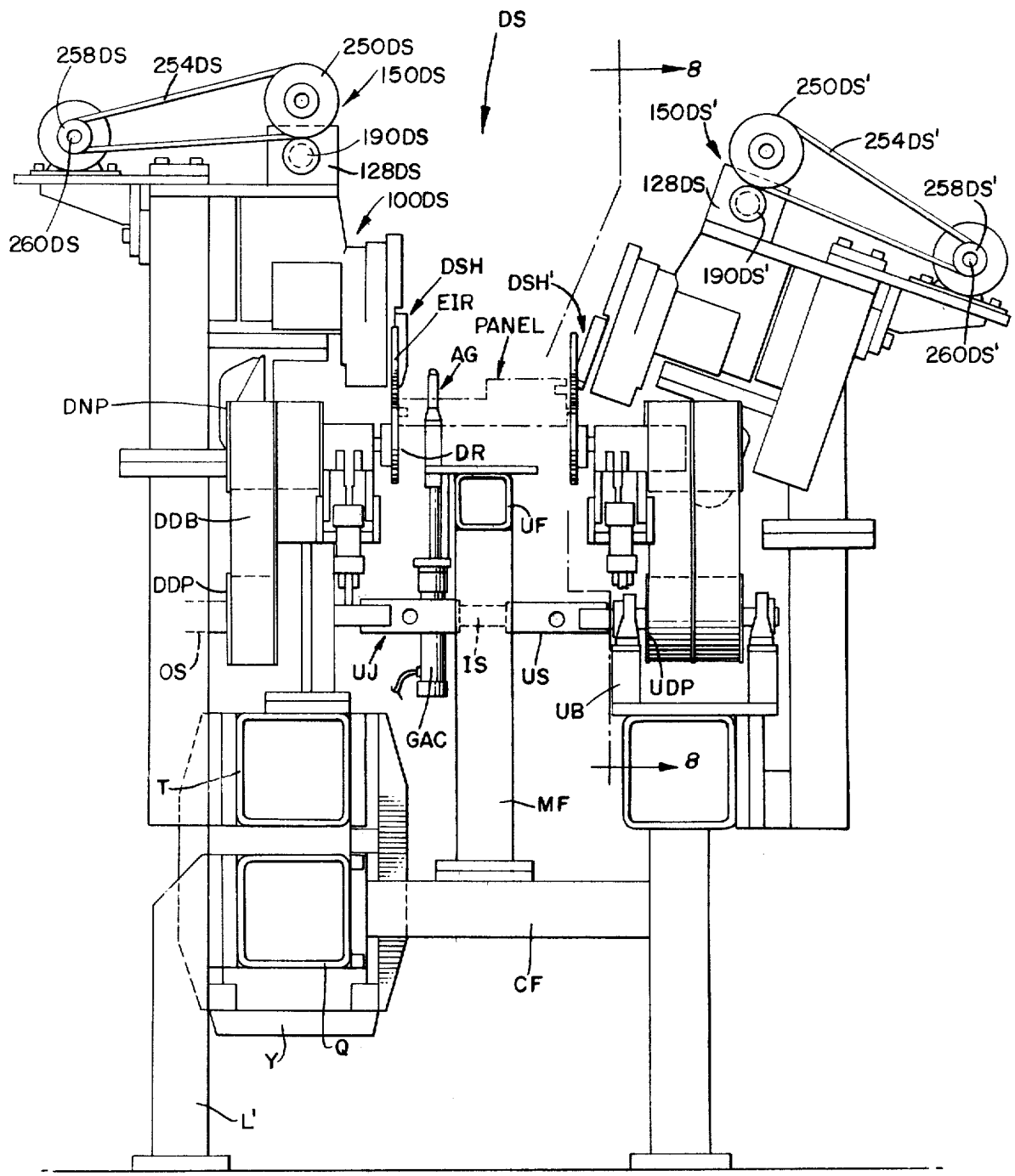
FIG. 7 is an elevation view taken along line 7—7 of FIG. 3.
Figure 8:
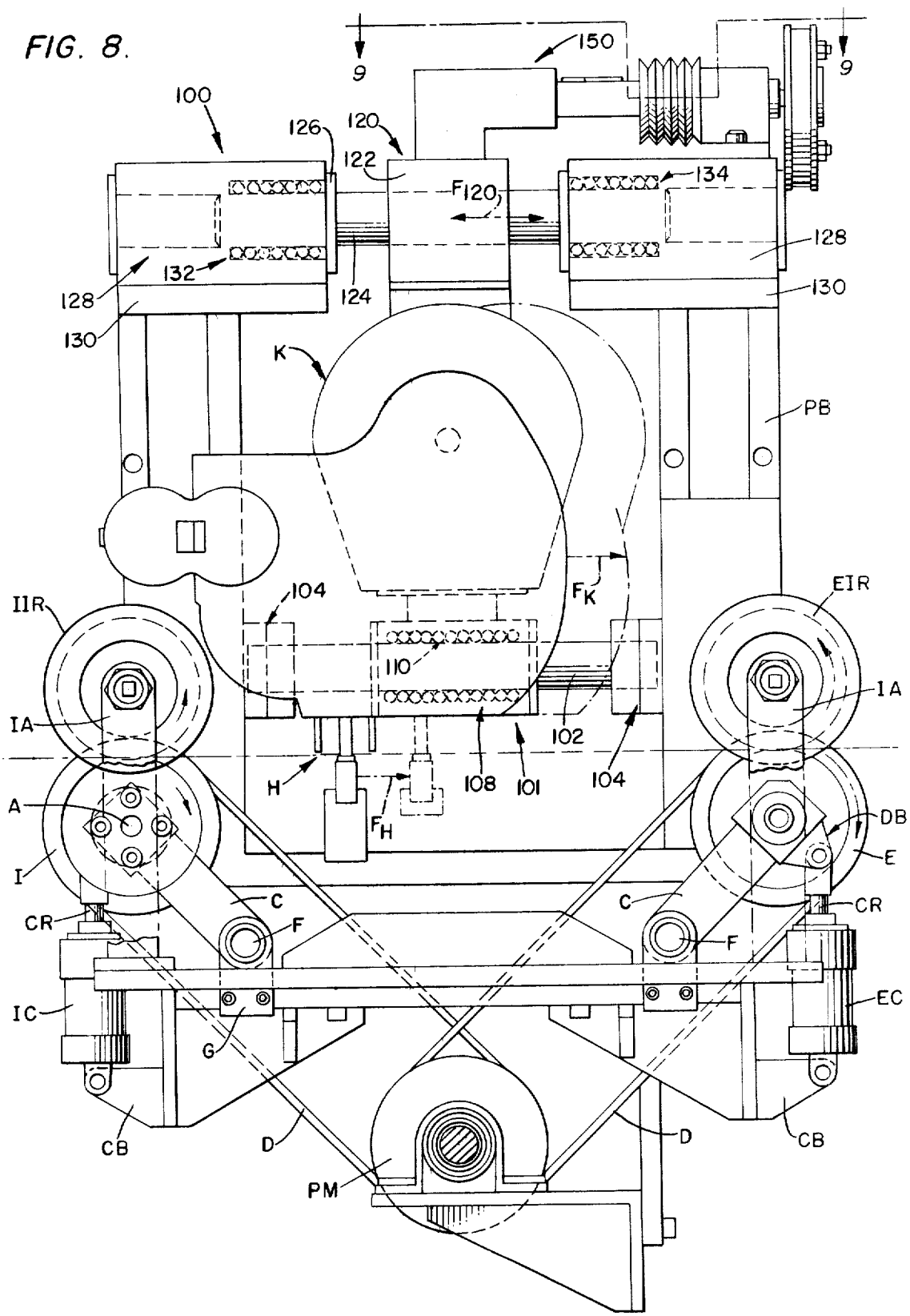
FIG. 8 is a view taken along line 8—8 of FIG. 7.

The stitching machines are best shown in FIGS. 6–8 and attention is now directed to FIG. 6 for a discussion of the single stitching machine SS. The single stitching machine SS is canted about a vertical centerline and includes legs L resting on a support surface and connected to a support beam B. The stitching machine includes a panel feed motor PM mounted on a stitching frame element and having an output shaft O connected thereto via a gear reducer mechanism R. The drive of this motor is monitored by an encoder/impulse generator which senses the lineal inches of material run and is included in a control circuit as will be discussed below. Drive pulleys P are mounted on the output shaft for rotation therewith and have drive belts D mounted thereon. The drive belts drive driven rollers which include an entrance driven roller I and an exit driven roller E as best shown in FIG. 8. Each of the rollers is mounted on a shaft A which is mounted on an arm C. The arm C is pivotally mounted on the frame of the stitching machine by a shaft F mounted in a bracket G. Entrance and exit drive roller air cylinders IC and EC are respectively mounted on the stitching machine frame at one end by a bracket CB. Each of the air cylinders has a rod CR extending out of the other end of the cylinders and connected to the driven rollers by a bracket DB connected to a frame element of the roller to move those rollers. Actuation of the air cylinders causes the driven rollers to pivot about the shafts F to receive a panel, as will be discussed below.

As best shown in FIG. 8, idler rollers IR are mounted above each of the driven rollers by arms IA which are connected to a stitching machine frame element. The idler rollers include an entrance idler roller IIR and an exit idler roller EIR. The rollers capture a panel therebetween and move that panel along the fabrication path as discussed above. Movement of the driven rollers away from the idler rollers permits a panel to be inserted between those rollers, then movement of the driven rollers toward the idler rollers permits those rollers to grasp the panel, whereupon rotation of the driven roller induced by the motor moves the panel through the stitching machine.

The stitching unit is shown in the Figures and is denoted by the reference indicator K. The stitching units are shown only broadly, as those stitching units are known to those skilled in the art. The stitching units have stitcher heads H attached thereto, which stitcher heads set the stitches $S_1$ through $S_4$ in the panels as indicated in FIGS. 1, 2, 4 and 5.

A saw W is mounted on an upright frame element PB and is used to sever the panel end edge J and zig-zag elements. The saw is movable and includes a lower track ST. A bracket SB mounts a cylinder SC on the upright frame element. The saw moves across the path of a panel and along that path to execute a flying cutoff of the end edge elements. A photocell sights the gap between panels, preferably, about 1/16 inch, and initiates the saw sequence. This saw sequence further includes movement of a gauge into the slot between panels. This gauge "wipes" through the joining strip and then returns to a home position. Movement of the gauge is governed and controlled by a controller (to be discussed hereinafter) which utilizes time control and comparison logic. One timer and four steps of operation check the panel dimensions at various points during the fabrication process.

As best shown in FIG. 8, the stitching unit K is mounted on the stitching machine to execute a flying stitching movement. That is, the stitcher head moves in the direction of panel movement at the speed of panel movement during the stitching operation. In this manner, the overall production flow is uninterrupted by the stitching operation. The movement of the stitcher head is indicated in FIG. 8 where the head moves from the position shown in solid lines to the position shown in phantom lines.

The mounting means for the stitching units are all similar, and thus only one mounting means will be described, it being understood that the description is equally applicable to all mounting means of the presently disclosed system.

The mounting means is best shown in FIG. 8 and is denoted by the reference numeral 100. The mounting means includes a lower bearing mechanism 101 which includes a lower support shaft 102 fixedly mounted at the ends thereof to the upright frame elements PB by mounting plates 104. A lineal ball bearing bushing 108 is mounted on the shaft 102 to move longitudinally on that shaft and includes a ball bearing mounting means 110 to facilitate that movement. As shown in the FIGS., the lower shaft is thus rigid on the ends thereof with the bearing being center mounted. Thus, any clearance in the bearing allows exaggerated shaft end movement, as compared to total movement permitted by bearing clearance in an end mounted (by bearings) shaft. The stitcher head is mounted on the bearing 108, and thus the bearing moves in the direction of arrow $F_H$ shown in FIG. 8. Movement of the bearing on the shaft is from a forwardmost position abutting the plates 104 with the head H in the solid line position in FIG. 8, to a rear position between the front and rear plates 104 with the head in the position shown in FIG. 8 in phantom lines.

An upper lineal ball bearing bushing mechanism 120 is mounted on top of the stitching unit and moves in the direction indicated by $F_{120}$. The bearing 120 includes a bearing block 122 fixedly mounted by set screws, or the like, on an upper support shaft 124 and the mechanism 120 moves longitudinally of the shaft 124 in a manner which will be described below. The entire mechanism 120, including the precision shaft 124 and the block 122 thus reciprocates in the direction $F_{120}$. Mounting plates 126 and mounting blocks 128 connect the upper support shaft to the fixed frame members. A plate 130 connects the mounting blocks to the fixed frame members.

The shaft 124 is mounted on the bearing block 128 by a pair of ball bearing means 132 and 134 on opposite ends of the shaft 124. Thus, the upper shaft is rigid in center mounting; whereas the lower shaft is rigid on the ends with the bearing being center mounted. The bearing block 122 is rigidly secured to the shaft 124 and, as will be discussed below, the entire mechanism 120, including the shaft 124 and block 122, moves in the direction $F_{120}$ to induce a stitching head movement indicated by the arrow $F_{16}$ in FIG. 8. The shaft 124 thus moves longitudinally in the bearings 132. The bearings 132 and 134 thus form two apexes of a triangle, with the bearing means 110 forming the third apex of that triangle. The triangular mounting formed by the bearings 132, 134, and 110 provides great stability to keep the stitching point on head H precisely positioned.

The upper bearing mechanism 120 induces the movement of the stitching unit, whereas the lower bearing mechanism is passive, in that it merely moves along with the stitching unit serving to guide and support that unit.

Figure 9:
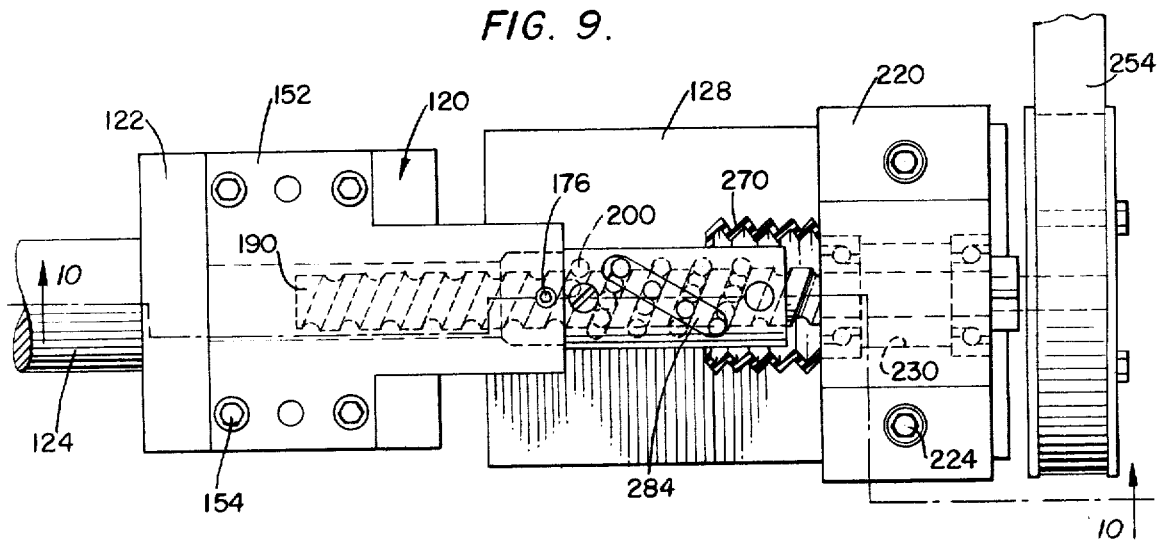
FIG. 9 is a view taken along line 9—9 of FIG. 8.
Figure 10:
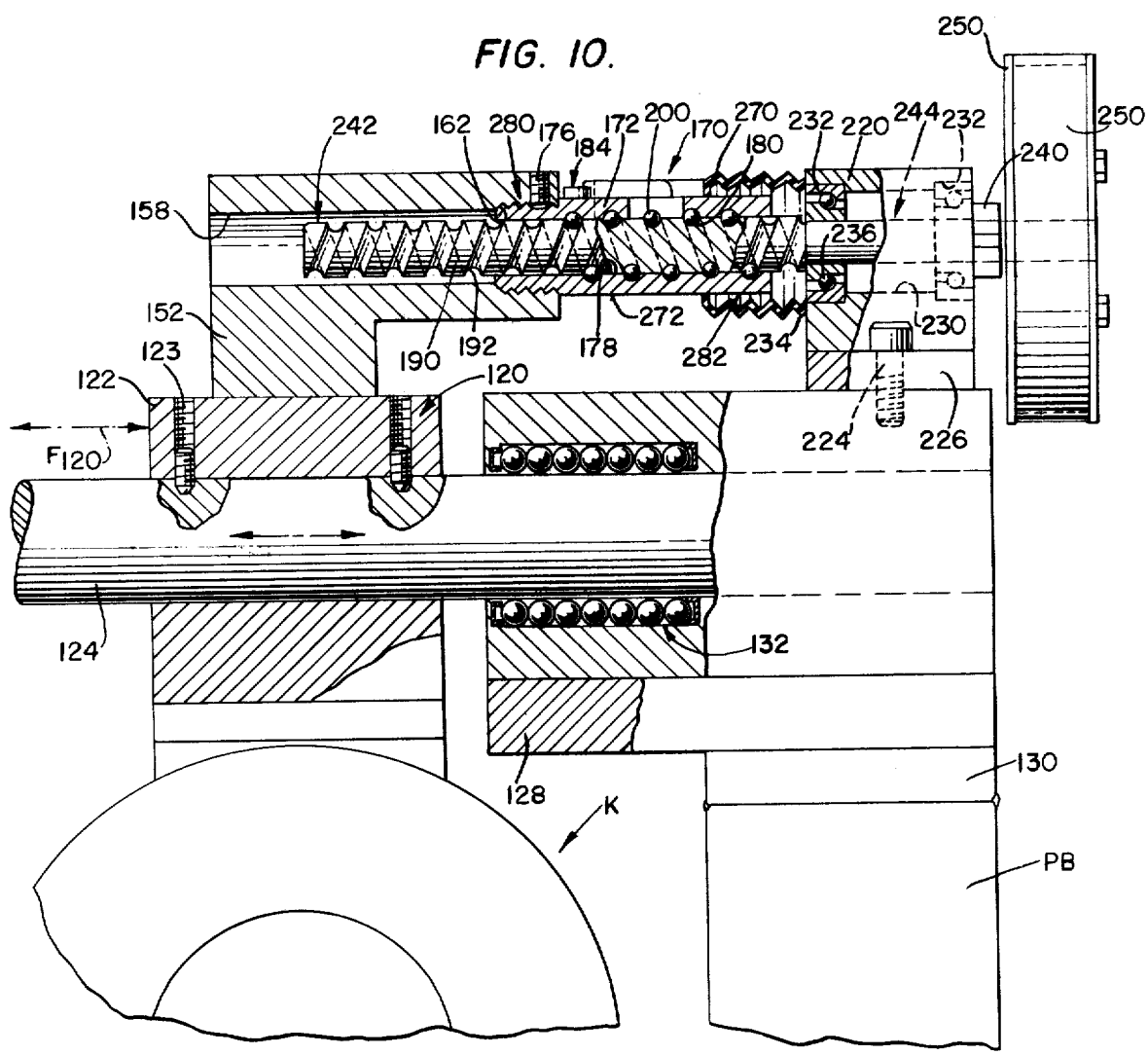
FIG. 10 is a view taken along line 10—10 of FIG. 9.

The means for moving the upper bearing mechanism 120 is denoted by the indicator 150 and is best shown in FIGS. 9 and 10. The moving means 150 includes an L-shaped follower block 152 mounted on top of the upper bearing block 122 by fasteners, such as bolts 154, or the like. The follower block has a bore 158 defined therethrough to be coaxial with the upper support shaft 124. Internal threads 162 are defined in the follower block at one end of the bore 158.

A ball screw assembly 170 is attached to the follower block and includes a tubular housing 172 having external threads on one end thereof for engaging threads 162 of the follower block to attach that housing to the block. A set screw 176 further attaches the housing to the follower block. The housing has an axial bore 178 defined therethrough and an internal helical thread 180 defined therein to open inwardly of the housing. A ball access means 184 is associated with the housing. The housing bore 178 is colienar with the bore 168 of the follower block, and a threaded screw 190 is colinear with the aligned axes of the two bores and extends through these two bores. The threaded screw 190 has an external helical thread 192 defined thereon which mates with the thread 180 of the housing to define a raceway. A plurality of roller balls 200 are accommodated in the raceway. The housing rests on the balls, and the balls thus act as roller ball bearings.

A ball screw mounting block 220 is mounted on mounting block 128 by fasteners, such as screws 224, and rests on a plate 226. The ball screw mounting block has an axial bore 230 defined therethrough and a pair of counterbores 232 on each end thereof. A bearing jacket 234 is mounted in each counterbore and thrust bearings 236 are contained within the bearing jackets. A shaft mount 240 is mounted on the block 220.

The threaded screw has a distal end portion 242 located near the upper lineal bearing mechanism block 122 and a proximal end portion 244 extending through and accommodated in the mounting block bore 230. The screw proximal end portion 244 is supported by the bearing jackets and extends out of the mounting block through the shaft mount 240 to extend beyond that shaft mount. A drive pulley 250 is fixedly mounted on the screw proximal end portion, and a pulley drive belt 254 is received in the pulley to rotatably drive that pulley.

As shown in FIG. 6, the drive belt 254 is mounted on a drive pulley 258 which is fixed on an output shaft 260 of a drive motor 262. The motor 262 is mounted on a support bracket 264 fixed to the fixed upright frame member of the stitching machine.

An accordian-like dust cover 270 is mounted at one end of the mounting block 220 and engages outer surface 272 of the housing at the other end thereof. The housing has a proximal end 280 located adjacent the follower block and a distal end 282 located adjacent the mounting block inside the dust cover. An access opening 284 is also defined in the housing.

Rotation of the motor output shaft 260 rotates the pulley 258 which causes the drive belt 254 to move. Movement of the drive belt causes rotation of the drive pulley 250 which rotates the threaded screw 190 about the longitudinal axis thereof. Rotation of the screw 190 causes axial movement of the follower block toward or away from the mounting block 220 as the screw 190 is fixed against axial movement in the block 220 while the follower block and housing are fixed against rotation but are free to move along an axial direction. Thus, linear movement of the follower block is induced by rotational movement of the screw 190 which, in turn, is induced by operation of the motor 262. Depending upon the direction of rotation, be it clockwise or counterclockwise, of the motor output shaft, the follower block will move toward or away from the mounting block 128. Thus, operation of the motor 262 in one direction causes the follower block to move in the feed direction of the panels, and operation of the motor 262 in the opposite direction causes the follower block to execute a return to home movement.

Movement of the follower block induces movement in the stitcher head, and thus, movement of the stitcher head H is controlled by operation of the motor 262 via the ball screw mechanism 170. The forward movement of the stitcher head from the solid line position in FIG. 8 to the phantom line position is in the feed direction of the panels, and is executed while motor 262 operates in one mode. The return movement is opposite to this movement and is executed while the motor 262 is operated in the opposite mode. Control of the motor 262 will be discussed below.

The dual stitching machine DS is shown in FIG. 7 and is a combination of two single stitching machines, with one of the stitching machines angled with respect to the other. It is noted that prior art stitching placed stitching unit shown on the right of FIG. 7 upside down so that the stitch was driven upward. This left the internal mechanism of the unit in a position for dirt, broken stitches and other debris to fall into the mechanism causing service problems of an extensive nature. The problem of debris could not be cured, so the new design required units to be mounted in an upright position. The shape of the panel and the shape of stitcher prevent a true vertical application in three of the four positions. Thus the unit is tilted. Various changes and modifications were made in the stitching unit to mate the panel and the stitcher in a workable union. The stitching heads are tapered and modified accordingly. The arm under the stitcher, that forms the wire, is changed from the prior art. This arm is shown in FIGS. 4 and 5. Thus, all units can successfully be placed in an upright position. Accordingly, only broad treatment will be given to the dual stitching machine. The dual stitching machine includes legs L' mounted on a support surface and connected to a fixed horizontal frame member Q which is attached by a yoke member Y to a movable horizontal frame member T. The movable and fixed frame members permit adjustment of the position of one of the stitching machines with respect to the other stitching machine. The single stitching machine shown in FIG. 6 can also have movable and fixed frame members if desired.

A pair of upright frame members are also mounted on the horizontal frame members as is cross frame member CF. A middle upright frame member MF is supported on the cross frame member, and an upper horizontal frame member UF is mounted on the frame member MF.

A drive motor (not shown) drives an output shaft OS which is connected to a drive pulley DDP which has a drive belt DDB trained therearound. The drive belt drives a driven pulley DNP which is mounted on a shaft. As above-discussed, there is a pair of driven pulleys, one for the entrance and one for the exit of the dual stitching machine. Each driven pulley is associated with a driven roller DR via a shaft. The driven rollers contact the edge of a panel to move that panel along the fabrication path. As shown in FIG. 7, and indicated in FIG. 3, the panel unit has been tilted so that the planer faces thereof are oriented to be essentially horizontal, and the interior and exterior panels have been superposed. The drive motors of the dual stitching machine are also controlled by the P.L.C. as discussed below.

A universal joint UJ is connected with the motor output shaft OS and transmits the drive of that shaft to an intermediate shaft IS, which is also connected to a universal shaft US. The universal shaft US is mounted for rotation in a bracket UB which is mounted on a horizontal frame member. The universal shaft US has a pair of driven pulleys UDP connected thereto which have belts trained therearound. These pulleys UDP drive the driven rollers of the other stitching machine so that the entrance and exit rollers of that stitching machine are driven by the motor which also drives the driven rollers of the first stitching machine of the dual stitching machine. The driven rollers of both stitching machines of the dual stitching machine are thus driven in consort so that the panel unit moving through the dual stitching machine is driven uniformly on both longitudinal side edges thereof. As above-discussed, the driven rollers are mounted on pivotal arms and are moved by air cylinders to contact and release a panel to drive that panel through the stitching machine.

As in the single stitching machine discussed above, each driven roller has an idler roller associated therewith. The idler rollers associated with the entrance driven rollers shown in FIG. 7 are denoted as EIR in FIG. 7.

A gauge is indicated by the reference indicator AG in FIG. 7 and controls a gauge air cylinder GAC. The gauge is activated by the panel unit and insures proper orientation of the interior and exterior units with respect to each other as those units pass into and through the double stitching machine DS.

The stitcher heads are indicated in FIG. 7 as DSH and DSH', and serve the function of setting stitches $S_2$ and $S_3$. As discussed above with regard to the single stitching machine, each of the stitching units of the dual stitching machine has a movable stitcher head which is moved to execute a flying stitch. Each of the stitcher heads is mounted on a mounting means 100DS which has a lower support shaft on which a lineal ball bearing bushing similar to lineal bearing 108 is mounted. The lineal bearings of the dual stitching machine move along the lower support shafts in the same manner as the lineal bearings of the single stitching machine shown in FIG. 8. The stitcher heads of the dual stitching machine also move in the fabrication direction at a speed corresponding to the panel velocity, then remove back to the beginning position after a stitch is set, as discussed above.

Each stitcher head DSH and DSH' also has an upper lineal bearing mechanism which also is mounted for translatory reciprocating movement in the direction of panel movement. The upper lineal bearing mechanism is mounted on an upper support shaft which is mounted on mounting blocks 128DS which are mounted on fixed frame members.

As discussed above with regard to the single stitching machine, the upper lineal bearing mechanism of the stitching units of the dual stitching machine induce the movement of the stitcher heads, whereas the lower bearing mechanisms merely move along with the stitcher heads.

The means for moving the upper bearing mechanisms are denoted in FIG. 7 by the indicators 150DS and 150DS'. Each of these means also includes an L-shaped follower block mounted on top of the lineal bearing block. The follower blocks are each connected to a ball screw to be moved thereby. The ball screw of the dual stitcher also has internal threads and threaded screws 190DS and 190DS' are colinear with the aligned axes of the ball screw and the follower block, and extends through bores defined in those elements. The threads of the screw mate with the threads of the ball nut housing and a raceway is defined thereby in which a plurality of balls are accommodated so the ball screw housing rests on those balls.

Each of the ball screws of the dual stitching machine has a ball screw mounting block through which the proximal portion of the screw extends. Each threaded screw of the dual stitching machine also has a distal end portion located near the upper lineal bearings.

Drive pulleys 250DS and 250DS' are each associated with one of the threaded screws of the dual stitching machine. Pulley drive belts 254DS and 254DS' are each received on a pulley to rotatably drive that pulley.

The drive belts 254DS and 254DS' are mounted on drive pulleys 258DS and 258DS' which are fixed on output shafts 260DS and 260DS' of drive motors 262DS and 262DS'. The motors are mounted on support brackets fixed to upright members of the dual stitching machine.

Dust covers are mounted on the mounting blocks of the dual stitching machine to cover the ball nut and housing as was discussed above with reference to FIGS. 9 and 10.

Operation of each of the stitching units in the dual stitching machine is similar to the operation described above with reference to the single stitching machine, and attention is directed thereto for that discussion.

In both the single and dual stitching machines, at predetermined intervals, a new stitch is instigated by the P.L.C. using measurements provided thereto by the drive encoder. When a new cycle begins, the oscillator drive motor accelerates the stitching unit. Acceleration of this unit is controlled by oscillator encoder information fed back to the P.L.C. to maintain a relative panel to stitching unit speed of zero.

A stitcher clutch is engaged, and a stitch is driven through the material of the panel, or panel unit, and the clutch is then disengaged. A stitcher brake is then applied thereby stopping the stitching unit in a position ready for the next cycle.

Coincident with clutch disengagement, the oscillator drive motor is reversed, thereby causing the stitching unit to decelerate, stop, then return to a home position. A proximity sensor is used to determine home position. Signals from the proximity sensor are used to control the oscillator motor so the stitching unit has the travel thereof decelerated and stopped at a predetermined position. Once the stitching unit is returned to the home position, that unit is ready for the next cycle.

Overtravel limit switches can be included in the ball screw assembly to prevent overtravel of the ball screw in either direction. Output from the sensors is also fed to the P.L.C.

Figure 11:
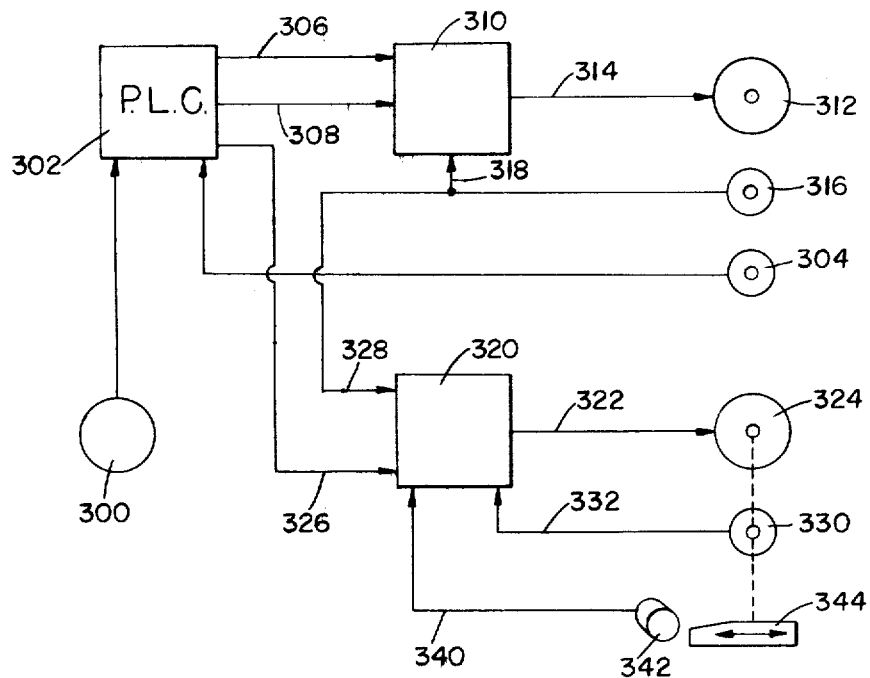
FIG. 11 is a schematic diagram showing a control system for the stitching units embodying the teachings of the present invention.

Control of the motors 262, 262DS and 262DS' is effected by panel position sensors and associated electronic circuitry. Sensors are located at appropriate locations to sense the position of the panel to initiate operation of the motors at an appropriate time. Account of motor inertia, as well as inertia of the other elements, is made in settings of the sensors and the associated circuitry to permit the motor to operate and move the stitcher heads H in an appropriate manner. The circuit elements and parameters will occur to those skilled in the art, and will not be herein described. However, it is noted that overall control of the stitcher head movement as well as movements of the rollers, saws, and other elements which moved in timed and sequential relationship with each other and with the panels is preferably controlled by a computer, either digital or analog, or a combination thereof. Attention is directed to FIG. 11 for a schematic diagram of a preferred control system.

An operator controls the system using an operator console 300 associated with and inputting to a programmable logic controller (P.L.C.) 302. The controller 302 also receives length data from a pulse encoder 304. The controller 302 utilizes the information supplied thereto by the operator and the other inputs thereto and generates a speed and direction command signal 306 and a run command signal 308 to the panel drive means 310, which controls the motors 312 associated with moving the panels by a signal 314.

A tachometer generator 316 generates a signal 318 which is input into the panel drive means 310 and provides information regarding the rotation of the motors.

An oscillator head drive means 320 is the ball nut drive means, and generates a signal 322 which is used to control the motor 324, which represents motors 262, 262DS and 262DS'. The drive means 320 receives a follow command signal 326 from the controller 302, and a speed reference signal 328 from the tachometer generator 316. A second tachometer generator 330 also generates a signal 332 which is input to the drive means 320.

A position command signal 340 is generated by a proximity sensor 342 and a proximity actuator 344 is input to the drive means 320.

The above-discussed circuit is applicable to the single stitching machine SS, and can be appropriately modified to be applied to the dual stitching means DS.

Figure 12:
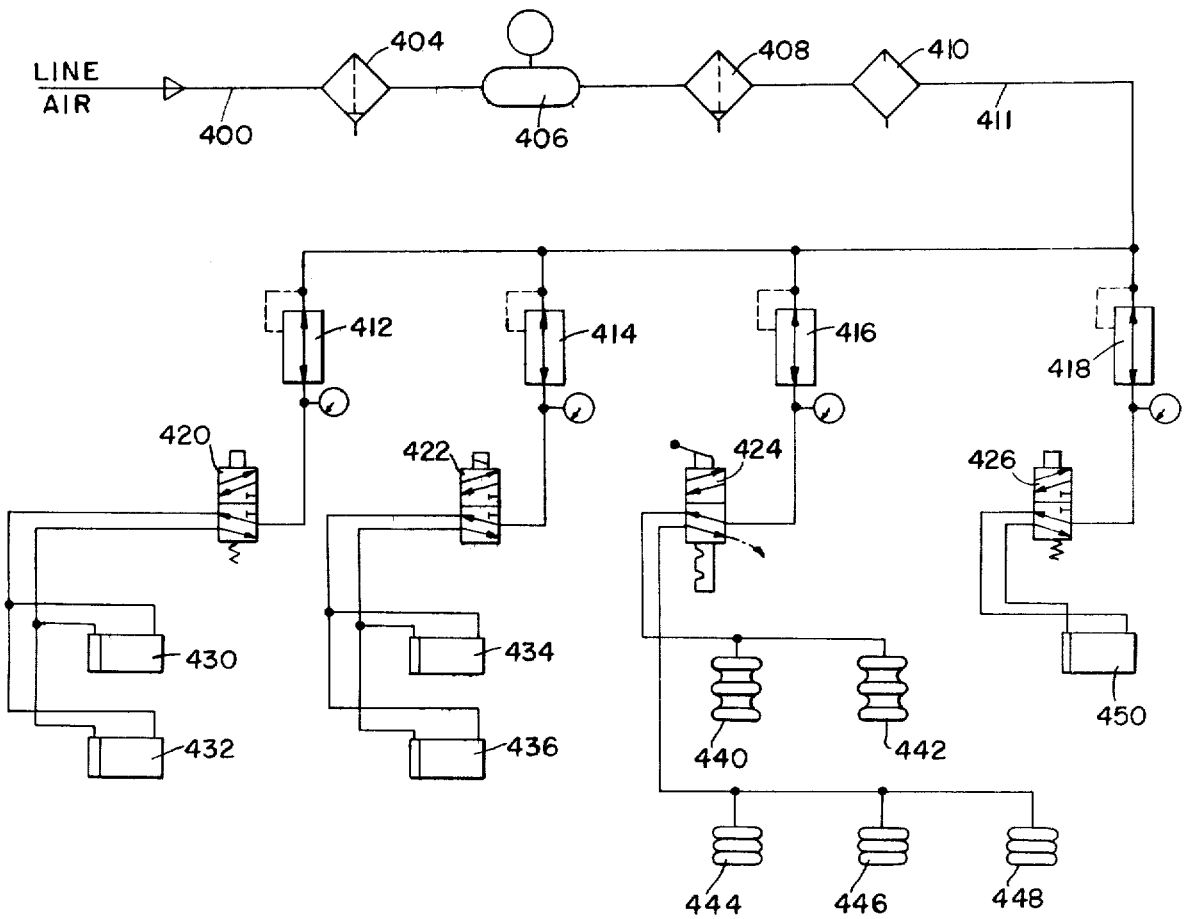
FIG. 12 is a schematic fluid power diagram showing a control system for the stitching units embodying the teachings of the present invention.
Figure 12A:
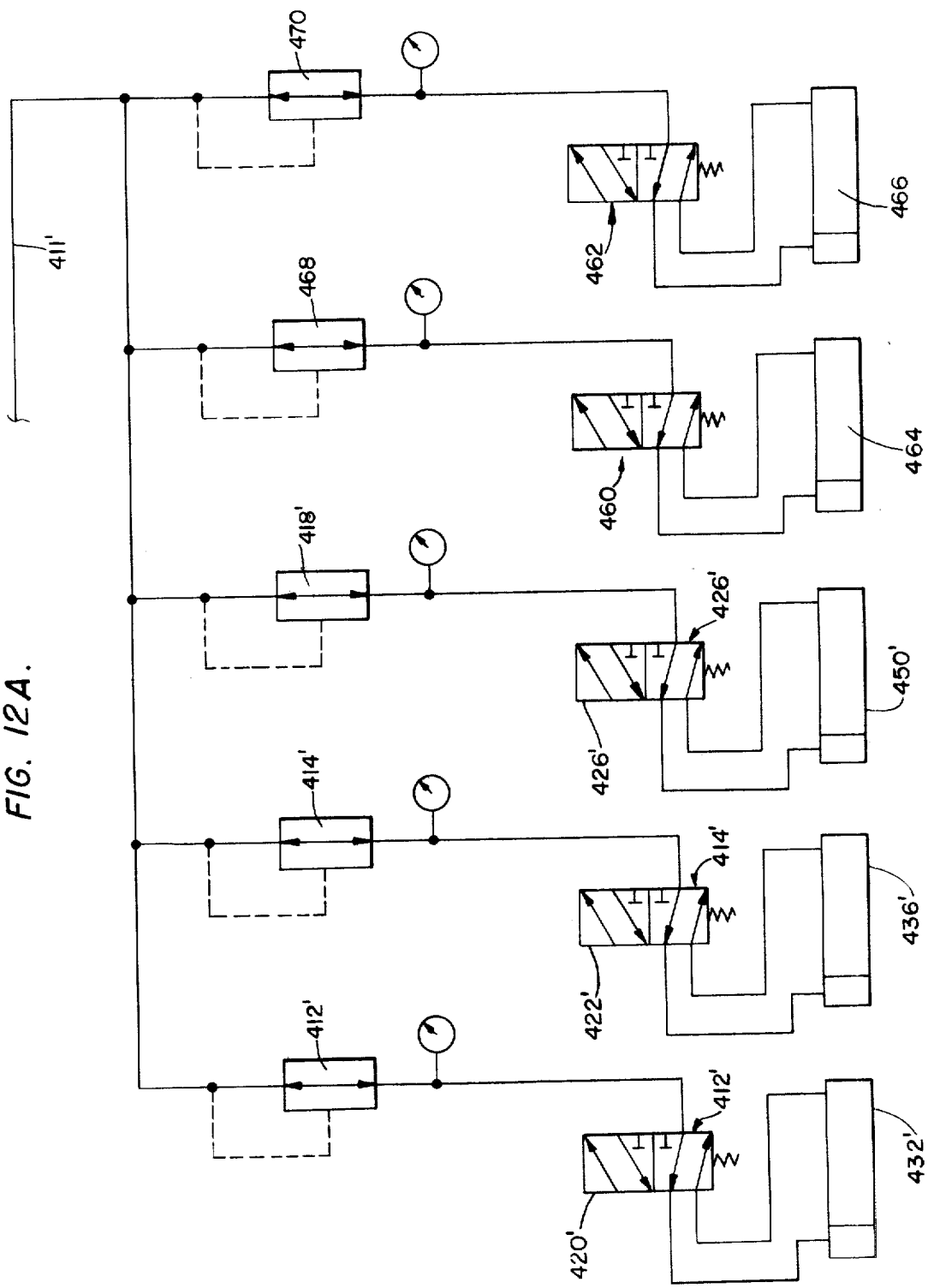
FIG. 12A is a schematic fluid power diagram showing a control system for a single stitching unit embodying the teachings of the present invention.

A preferred fluid power circuit is shown in FIG. 12 and is used to control movement of the pinch rollers in the dual stitcher. Appropriate modifications of the circuit shown in FIG. 12 can be made to apply that circuit to a single stitcher. Such modifications are shown in FIG. 12A. The fluid power circuit shown in FIG. 12 includes an air supply line 400 which receives high pressure air from a source (not shown). Air from the line 400 passes sequentially through a 20 micro general purpose filter 404, a pressure gauge monitor 406, a three micron filter 408, and a micro fog lubricator 410.

The air passes from the lubricator 410 into line 411 which has four valves 412 through 418, respectively, each having a gauge associated therewith. Air from each of the valves 412 through 418 passes into one of four two-position valves 420 through 426. From the valves 420 through 422, the air passes into the pinch roll cylinders to operate those cylinders as above-discussed. Thus, air from valve 420 operates entrance pinch roll cylinders 430 and 432, and air from the valve 422 operates the exit pinch roll cylinders 434 and 436. Air from valve 424 operates pneumatic air cylinders 440 through 448 and air from valve 426 operates the gauge cylinder 450. The air cylinders 440 and 442 are in the "down" position, and the cylinders 444 through 448 are in the "up" position. Cylinders 440–448 are perferably Firestone Air Bag type actuators. Their purpose is to raise and lower one side of the assembly to match stitching position differences in the 4" and 3" panel units. Cylinders 440 and 442 press the movable frame down against stop blocks to stabilize the unit against vibration or any movement of the Acme/Interlake head from the alignment desired. Cylinders 444–446 and 448 lift the weight of the movable frame and stitcher against upper stop blocks and stabilize it in the up position.

As shown in FIG. 12A, the valves and the like which correspond to those elements of a dual stitcher are denoted by prime notation. It is also noted that valves 460 and 462 control operation of saw gauge cylinder 464 and saw activate cylinder 466, respectively. In the single stitcher, cylinder 432' represents the entrance drive roll, cylinder 436' represents the exit drive roll, and cylinder 450' represents the panel stop position gauge. Valves 468 and 470 also control fluid flow to the valves 460 and 462, respectively.

Preferably, the cylinders 430 through 436 are 1½ inch bore, 1 inch stroke cylinders, and cylinder 450 is a 1½ inch bore, 5 inch stroke cylinder. Preferably, the filter 404 and the lubricator 410 are Norgren elements, while the three micron filter 408 is a Numatrol element.

Operation of the system is evident from the above discussion, and will thus be detailed only broadly. Attention is directed to the various elements for more detailed discussions of the operation.

Material from supplies is formed into interior panels and exterior panels of the panel units such as disclosed in the referenced Bellem Patent. The panels move along a conveyor belt to a tiltup station where they are tilted up on edge and moved onto another conveyor which feeds the edge up panels to a first stitching machine. Edge connectors are placed on the panels, and the panels are each moved into the stitching machine by entrance rollers and stitcher head is moved along with the panel as that panel passes through the machine. The stitcher head is moved by the ball screw assembly and executes a flying stitch, that is one effected while the panel and stitcher head are both moving so there is no stop/start step required in the panel fabrication flow path to effect the stitch. The first stitching machine sets stitches $S_1$ and $S_4$.

The exit rollers of the stitching machine propel the stitched panel onto a further conveyor which moves the panel toward a dual stitching machine. Batting, or other insulation, can be placed on the interior panels during this movement.

The interior and exterior panels are superposed and fed to a dual stitching machine. The dual stitching machine sets stitches $S_2$ and $S_3$ to couple the interior and exterior panels together to form a panel unit. The panels are propelled through the dual stitching machine, and the stitches $S_2$ and $S_3$ are also set by a flying stitcher head so that the panel continues to move at all times.

The panel unit is then transferred by driven exit rollers from the dual stitching machine to a further conveyor, which moves the finished panel units to a packaging or storage area. Insulation strips are placed on the panel units after the panels are stitched together. End plates are also applied after the panels are coupled together. The panel units are then ready for shipment or storage.

Preferably, the following equipment is included in the hereinabove disclosed system:

Bulletin 1774 programmable controller with about 400 installed inputs and outputs;

Six Bulletin 1374 single-phase regenerative drives with permanent magnet motors, as a type of semi-servo drive for head acceleration positioning to accuracies of about 1/10 inch;

Eight Bulletin 1313 package drives for speed control of conveyors;

Bulletin 500 motor starters;

Bulletin 1494V variable depth circuit breaker operators;

A-B control relays, fuse blocks, limit switches, pressure switches and components (including some A-B hot-molded carbon composition fixed resistors).

It is noted that the operation of the system can be monitored or recorded using recording equipment associated with the P.L.C. Thus, a program can be recorded or verified from a memory element of the P.L.C. or loaded into a read/write memory via a portable P.L.C. cassette recorder. Furthermore, appropriate motor starters, and the like, can be housed in special enclosures near the line. Enclosures containing power supplies, processors, and input/output racks can also be located adjacent the line.

Using the control systems, and the like, of the present system, material can be accurately positioned. Furthermore, speed settings can be supplied from controller analog outputs. Besides analog output cards, the system can use encoder input cards (preferably, modified A-B numerical control cards), internal timers, data contacts for dimension control and speed commands, and AC and DC input and output cards. Preferably using about 2K (2028 words) of an 8K memory, the system has substantial capacity for expansion.

Diagnostic reporting is also possible using appropriate monitors, and the like associated with the present system.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A flying stitcher for stitching panels comprising:
a support means having a forward end and a rear end;
panel moving means on said support means for moving a panel to be stitched from said forward end to said rear end;
stitcher head support means movably mounted on said support means for movement between a forward position and a rear position;
a stitcher head mounted on said stitcher head support means for movement therewith for placing stitches in a panel as such panel moves from said support forward end to said support rear end;
said stitcher head support means including a first horizontally disposed precision shaft immovably mounted on said support means, a first lineal ball bearing bushing movably mounted on said first precision shaft, second and third lineal ball bearing bushings securely mounted on said support means above said first precision shaft to form with said first ball bearing bushing apices of an upright triangle, and a second horizontally disposed precision shaft movably mounted in said second and third ball bearing bushings, said stitcher head being attached to said first lineal ball bearing bushing and to said second precision shaft with said triangular configuration of said bearing bushings providing stability to maintain said stitching head precisely positioned while permitting said head to reciprocate between said support means forward and rear ends; and
a motor mounted on said support means and connected to said stitcher head to move said stitcher head.

2. The flying stitcher as defined in claim 1, wherein said panel moving means includes a driven roller and an idler roller which are positioned to capture a panel therebetween.

3. The flying stitcher as defined in claim 2, wherein said panel moving means includes a driven roller and an idler roller located adjacent said forward end and a driven roller and an idler roller located adjacent said rear end.

4. The flying stitcher as defined in claim 3, wherein said panel moving means further includes a motor mounted on said support means and drive belts connecting said motor to said driven rollers.

5. The flying stitcher as defined in claim 3, wherein said panel moving means further includes driven roller moving means mounted on said support means for moving said driven rollers toward and away from said idler rollers for capturing and releasing a panel.

6. The flying stitcher as defined in claim 5, wherein said driven rollers are pivotably mounted on said support means.

7. The flying stitcher as defined in claim 1, wherein said stitcher head support means further includes a follower block connected to said second mounting mechanism.

8. The flying stitcher as defined in claim 7, wherein said stitcher head support means further includes a ball screw assembly attached to said follower block for moving said follower block between said forward and rear positions.

9. The flying stitcher as defined in claim 8, wherein said ball assembly includes a tubular housing attached to said follower block, said housing and said follower block each having a bore defined therein with said bores being axially aligned, a screw positioned within said aligned bores, said screw having an external thread defined therein and said housing having an internal thread defined therein which cooperates with said screw thread to define a raceway, a plurality of balls positioned within said raceway on which said housing rests, screw rotating means for rotating said screw, screw mounting means for mounting said screw on said support means, said screw being rotatable within said screw mounting means but transversely immovable within said mounting means so that rotation of said screw causes said housing to move longitudinally of said screw so that rotational movement of said screw is translated into linear movement of said housing and associated follower block.

10. The flying stitcher as defined in claim 9, wherein said screw rotating means includes a motor mounted on said support means and connected to said screw.

11. The flying stitcher as defined in claim 9, further including a dust cover attached to said screw mounting means and covering a portion of said screw and a portion of said housing.

12. The flying stitcher as defined in claim 1 wherein said stitcher head is at an angle with respect to the vertical.

13. A flying stitcher for stitching panels comprising:
a support means having a forward end and a rear end;
panel moving means on said support means for moving a panel to be stitched from said forward end to said rear end;
a pair of stitcher head support means movably mounted on said support means for movement between a forward position and a rear position;

a pair of stitcher heads each mounted on one of said stitcher head support means for movement therewith for placing stitches in a panel as such panel moves from said support forward end to said support rear end;

each of said stitcher head support means including a first horizontally disposed precision shaft immovably mounted on said support means, a first lineal ball bearing bushing movably mounted on said first precision shaft, second and third lineal ball bearing bushings securely mounted on said support means above said first precision shaft to form with said first ball bearing bushing apices of an upright triangle, and a second horizontally disposed precision shaft movably mounted in said second and third ball bearing bushings, said stitcher head being attached to said first lineal ball bearing bushing and to said second precision shaft with said triangular configuration of said bearing bushings providing stability to maintain said stitching head precisely positioned while permitting said head to reciprocate between said support means forward and rear ends; and a motor mounted on said support means and connected to said stitcher head to move said stitcher head.

14. The flying stitcher as defined in claim 13, wherein one of said stitcher heads is at an angle with respect to the other one of said stitcher heads.

15. The flying stitcher as defined in claim 14, wherein said panel moving means includes a pair of driven rollers and a pair of idler rollers which are positioned to capture a panel therebetween.

16. The flying stitcher as defined in claim 15, wherein said panel moving means includes a pair of driven rollers and a pair of idler rollers located adjacent said forward end and a pair of driven rollers and a pair of idler rollers located adjacent said rear end.

17. The flying stitcher as defined in claim 16, wherein said panel moving means further includes a motor mounted on said support means and drive belts connecting said motors to said driven rollers.

18. The flying stitcher as defined in claim 15, wherein said panel moving means further includes driven roller moving means mounted on said support means for moving said driven rollers toward and away from said idler rollers for capturing and releasing a panel.

19. The flying stitcher as defined in claim 18, wherein said driven rollers are pivotably mounted on said support means.

20. The flying stitcher as defined in claim 13, wherein said stitcher head support means further includes a pair of ball screw assemblies each attached to one of said follower blocks for moving said one follower block between said forward and rear positions.

21. The flying stitcher as defined in claim 20, wherein said ball assemblies each includes a tubular housing attached to one of said follower blocks, said housing and said follower blocks each having a bore defined therein with said bores being axially aligned, a pair of screws each positioned within one pair of said aligned bores, said screws each having an external thread defined therein and said housings each having an internal thread defined therein which cooperates with said each screw thread to define a raceway, a plurality of balls positioned within each said raceway on which one of said housings rests, a pair of screw rotating means for rotating said screws, a pair of screw mounting means for mounting said screws on said support means, said screws each being rotatable within said screw mounting means but transversely immovable within said mounting means so that rotation of said screws causes said housings to move longitudinally of said screws so that rotational movement of said screws is translated into linear movement of said housings and associated follower blocks.

22. The flying stitcher as defined in claim 13, further including a pair of dust covers each attached to one of said screw mounting means and covering a portion of said screws and a portion of one of said housings.

23. The flying stitcher as defined in claim 1, further including control means for controlling said panel moving means.

24. The flying stitcher as defined in claim 1, further including control means for controlling movement of said stitcher head support means.

25. The flying stitcher as defined in claim 23, wherein said control means includes a programmable logic control unit.

26. The flying stitcher as defined in claim 24, wherein said control means includes a programmable logic control unit.

27. The flying stitcher as defined in claim 24, wherein said control means further includes proximity sensors for sensing position of a panel, and a proximity actuator.

28. The flying stitcher as defined in claim 23, wherein said control means further includes a pulse encoder for generating length signals.

29. The flying stitcher as defined in claim 23, wherein said control means further includes a tachometer generator.

30. The flying stitcher as defined in claim 24, wherein said control means further includes a tachometer generator.

31. The flying stitcher as defined in claim 1, further including a fluid power circuit for controlling movement of said panel moving means.

32. The flying stitcher as defined in claim 31, wherein said fluid power circuit includes a filter, a plurality of valves and a lubricator.

33. The flying stitcher as defined in claim 32, wherein some of said valves are two-position valves.

34. The flying stitcher as defined in claim 13, further including control means for controlling said panel moving means.

35. The flying stitcher as defined in claim 13, further including control means for controlling movement of said stitcher head support means.

36. The flying stitcher as defined in claim 34, wherein said control means includes a programmable logic control unit.

37. The flying stitcher as defined in claim 35, wherein said control means includes a programmable logic control unit.

38. The flying stitcher as defined in claim 35, wherein said control means further includes proximity sensors for sensing position of a panel, and a proximity actuator.

39. The flying stitcher as defined in claim 34, wherein said control means further includes a pulse encoder for generating length signals.

40. The flying stitcher as defined in claim 34, wherein said control means further includes a tachometer generator.

41. The flying stitcher as defined in claim 35, wherein said control means further includes a tachometer generator.

42. The flying stitcher as defined in claim 13, further including a fluid power circuit for controlling movement of said panel moving means.

43. The flying stitcher as defined in claim 42, wherein said fluid power circuit includes a filter, a plurality of valves and a lubricator.

44. The flying stitcher as defined in claim 43, wherein some of said valves are two-position valves.

* * * * *